United States Patent
Penton et al.

(10) Patent No.: US 7,757,002 B2
(45) Date of Patent: Jul. 13, 2010

(54) METHOD AND SYSTEMS FOR ANALYZING NETWORK CONTENT IN A PRE-FETCHING WEB PROXY

(75) Inventors: Clifford Penton, Abingdon (GB); Tim Kenyon, Oxford (GB)

(73) Assignee: Sophos PLC, Abingdon (GB)

( * ) Notice: Subject to any disclaimer, the term of this patent is extended or adjusted under 35 U.S.C. 154(b) by 528 days.

(21) Appl. No.: 11/690,477

(22) Filed: Mar. 23, 2007

(65) Prior Publication Data
US 2008/0235239 A1 Sep. 25, 2008

(51) Int. Cl.
G06F 11/00 (2006.01)
G06F 12/14 (2006.01)
G06F 15/16 (2006.01)
G06F 12/16 (2006.01)

(52) U.S. Cl. .......... 709/246; 709/219; 726/22; 726/24; 726/26; 370/352; 706/54

(58) Field of Classification Search .......... 709/246, 709/217–228; 706/54; 370/352; 726/24, 726/22, 26
See application file for complete search history.

(56) References Cited

U.S. PATENT DOCUMENTS

| 2004/0258053 A1 * | 12/2004 | Toporek et al. ............. 370/352 |
| 2005/0240574 A1 * | 10/2005 | Challenger et al. ............. 707/3 |
| 2008/0208789 A1 * | 8/2008 | Almog ........................ 706/54 |

* cited by examiner

Primary Examiner—Haresh N Patel
(74) Attorney, Agent, or Firm—Strategic Patents, P.C.

(57) ABSTRACT

Certain embodiments of the present invention provide methods and systems for providing access to network content. Certain embodiments provide a proxy system for providing access to network content. The system includes a content retriever for retrieving a first content on a network. The content retriever is configured to pre-fetch additional content linked or connected to the first content. The system also includes a content analyzer for analyzing the first content and the pre-fetched additional content according to a content policy and allowing access to the first content and the pre-fetched additional content in accordance with the content policy. The system further includes a content renderer for rendering allowed content for provision to a user upon user request. The renderer can also modify links to content based on a status of the linked content.

34 Claims, 3 Drawing Sheets

METHOD AND SYSTEMS FOR ANALYZING NETWORK CONTENT IN A PRE-FETCHING WEB PROXY

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention generally relates to analysis of Internet content for user access. More particularly, the present invention relates to pre-fetching linked content for analysis in advance of user access via a proxy.

A World Wide Web (Web) proxy pre-fetches content embedded in other content being cached and/or otherwise provided via the proxy. A proxy is a computer or Web service, for example, that offers a network service to allow clients to make indirect network connections to other network services. A client connects to the proxy server, then requests a connection, file and/or other resource available on a different server. The proxy provides the resource either by connecting to the specified server or by serving it from a cache. In some cases, the proxy may alter the client's request or the server's response for various purposes.

Certain proxies may be implemented as Web proxies to attempt to block offensive Web content, for example. Web proxies may reformat Web pages for a particular purpose and/or audience; for example (e.g., reformatting Web pages for cell phones and personal digital assistants). Network operators can also deploy proxies to intercept computer viruses and other hostile content served from remote web pages.

Certain Web proxies are classified as "CGI proxies." CGI or Common Gateway Interface proxies are Web sites that allow a user to access another Web site through the CGI proxy, for example. CGI proxies generally use a hypertext processor, such as PHP, or CGI to implement proxying functionality. CGI proxies may be used to gain access to web sites blocked by corporate or school proxies. Since a CGI proxy may also hide a user's own Internet Protocol (IP) address from Web sites accessed through the proxy, CGI proxies may also be used to gain a degree of anonymity, called "Proxy Avoidance."

Many organizations including corporations, schools, and families use a proxy server to enforce acceptable network use policies (e.g., censorware) or to provide security, anti-malware and/or caching services. A traditional Web proxy is not transparent to the client application, which must be configured to use the proxy (manually or with a configuration script). In some cases, where alternative means of connection to the Internet are available (e.g., a SOCKS or other Internet server or Network Address Translation (NAT) connection), the user may be able to avoid policy control by resetting a client configuration and bypassing the proxy. Furthermore, administration of browser configuration can be a burden for network administrators.

An intercepting proxy combines a proxy server with NAT. Connections made by client browsers through the NAT are intercepted and redirected to the proxy without client-side configuration. Intercepting proxies may be used in businesses to prevent avoidance of acceptable use policy and to ease administrative burden, since no client browser configuration is required. Intercepting proxies may also be used by Internet Service Providers in many countries in order to reduce upstream link bandwidth requirements by providing a shared cache to their customers.

Typically, users spend a reasonable amount of time reading a Web page after the page has been requested. Users are more likely to click on or select a link on the current page rather than enter a completely unrelated Web address or URL (Uniform Resource Locator).

A number of web proxy and content filtering products include an ability to analyze contents of a requested Web page. For example, Web page URL and/or component content may be compared against a list of blocked URLs, a list of allowed URLs, malware and/or other content definition, etc. However, Web pages are only fetched if the pages are explicitly requested. That is, content analysis must be done at a time the page is first fetched. For example, content analysis is executed when a user clicks on or selects a link on a Web page to access another Web page. Content analysis at access may restrict the depth of analysis possible, as a streaming latency of a requested page must be kept to a minimum. Thus, systems and methods providing more detailed and/or customized analysis of Web pages would be highly desirable.

Currently systems, such as the NetCache DynaBLocator, either use a static list of URLs for Web page content analysis or analyze a page when the page is requested. Therefore, content analysis must be quick to keep page rendering latency low. When viewing pages via a web proxy, access to some websites referred to in a current page may not be accessible due to a policy restriction. A user browsing the Internet may be frustrated to discover that access to a particular site is blocked only after clicking on a link. Thus, there is a need for systems and methods to improve Web page content analysis while maintaining a low page rendering latency.

BRIEF SUMMARY OF THE INVENTION

Certain embodiments of the present invention provide methods and systems for providing access to network content.

Certain embodiments provide a proxy system for providing access to network content. The system includes a content retriever for retrieving a first content on a network. The content retriever is configured to pre-fetch additional content linked or connected to the first content. The system also includes a content analyzer for analyzing the first content and the pre-fetched additional content according to a content policy and allowing access to the first content and the pre-fetched additional content in accordance with the content policy. The system further includes a content renderer for rendering allowed content for provision to a user upon user request.

Certain embodiments provide a method for content analysis via a proxy. The method includes pre-fetching additional content linked or connected to a first content. The method also includes analyzing the pre-fetched additional content according to a content policy. The method further includes allowing access to the pre-fetched additional content in accordance with the content policy. Additionally, the method includes rendering allowed content for provision to a user upon user request.

Certain embodiments provide a computer readable medium having a set of instructions for execution on a computer. The set of instructions includes a content retrieval routine for retrieving a first content on a network. The content retrieval routine is configured to pre-fetch additional content linked or connected to the first content. The set of instructions on the computer readable medium also includes a content analysis routine for analyzing the first content and the pre-fetched additional content according to a content policy and allowing access to the first content and the pre-fetched additional content in accordance with the content policy. The set of instructions further includes a content rendering routine for rendering allowed content for display to a user upon user request.

For example, a proxy system may provide access to network content. The proxy system may include a content retriever retrieving content on a network; a content analyzer identifying and analyzing one or more links in the first content according to a content policy; and a content renderer for rendering content for display to a user. The content renderer renders a representation of the one or more links in the content based on a status of the one or more links. In certain embodiments, the status of the one or more links is based on a categorization of the one or more links. The categorization may be obtained from a database of link categorizations, for example. The link categorizations may be based on content analysis, for example. In certain embodiments, content analysis and link categorization are performed a local computing device including the content renderer and/or a remote computing device for transmission to a local computing device including the content renderer, for example. Link status may include allowed, blocked or restricted, for example. A link status of blocked or restricted may also include a reason for blocking or restriction, for example. In certain embodiments, link status dynamically changes based on analysis of retrieved content by the content analyzer.

Figure 1:
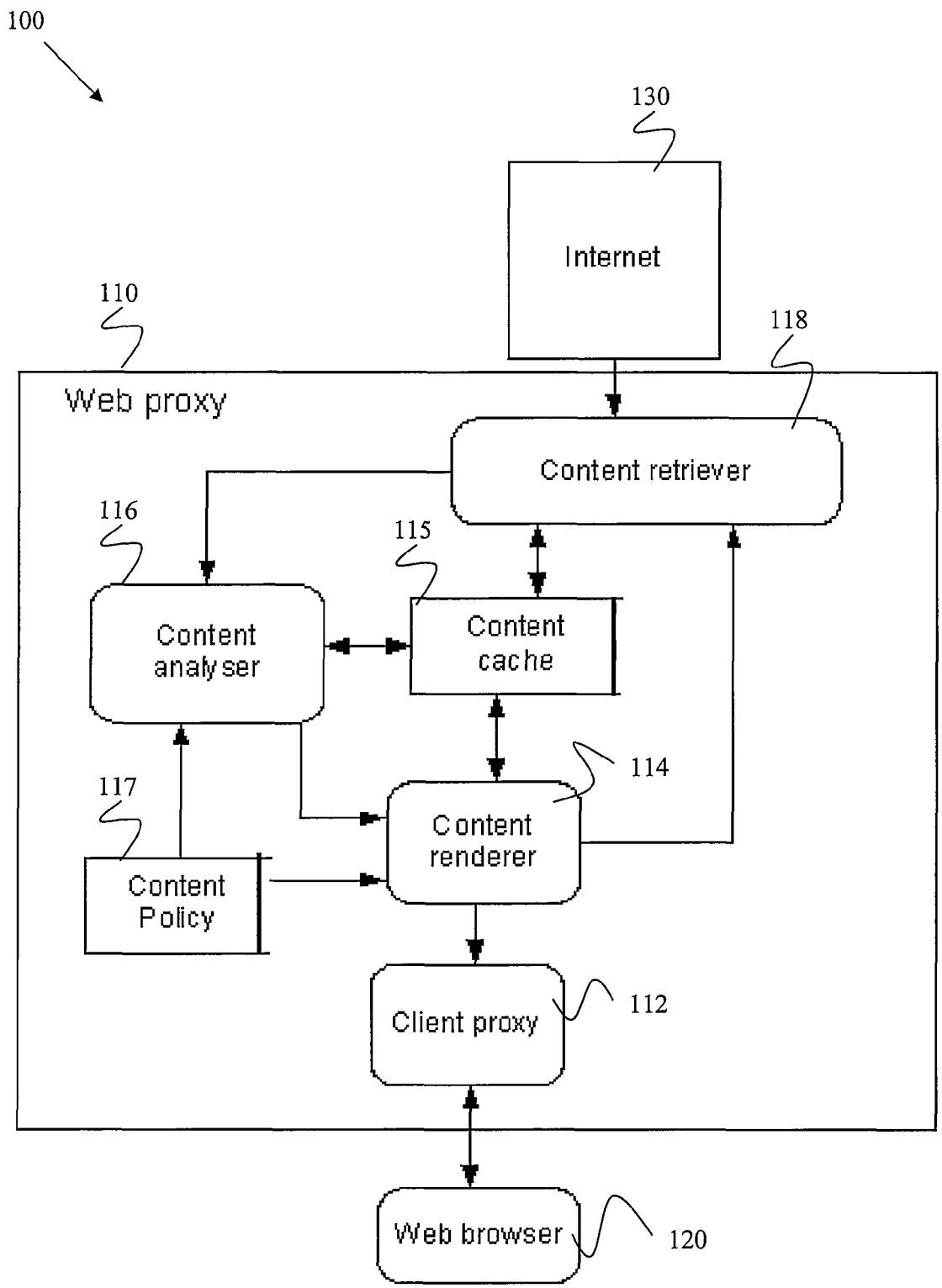
FIG. 1 illustrates a system for access to Internet content in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Certain embodiments provide a Web proxy that pre-fetches Web pages and/or other Internet or intranet accessible display of information (collectively referred to herein as "pages" for convenience) from Uniform Resource Locators (URLs) or other addressing schemes embedded in pages being cached by the Web proxy. In certain embodiments, the proxy constructs a graph of pages related to a current page. Pages can be related either directly or indirectly from the current page by following a chain of links, for example. The proxy modifies a user's access policy for page(s) depending on information available to the proxy regarding the URL. The information includes static (e.g., based on proxy and/or page policy) and/or dynamic (e.g., based on analysis of content) information, for example.

In certain embodiments, pages and/or other electronic content may be pre-fetched (e.g., completely or partially retrieved) before being requested for viewing by a user. However, a certain proxy may include a policy to block or prevent access to a URL. With pre-fetched pages, link(s) to related page(s) can be marked to indicate that the page(s) are being scanned but that the link(s) may or may not be authorized for selection soon, for example. A link may also be rendered inaccessible, depending on why the link is blocked or restricted (e.g., "site known to contain malware" or "out of hours" or "inappropriate content", etc.). For example, link(s) may be rendered using a browser-side scripting, such as JavaScript, to poll a Web proxy to determine a current status of any links that have been blocked because the link status is unknown. In certain embodiments, link status may be dynamically updated as content associated with the link is analyzed and classified, for example.

By pre-fetching and analyzing related pages, a user's browsing experience may be enhanced as the user does no have to wait for related pages to be received. Additionally, pre-fetching may permit use of more detailed analysis of unknown pages as the proxy server has more time available to perform the analysis. Time may be traded for storage space (e.g., memory and disk), for example. Certain embodiments provide pre-fetching systems and methods in a Web proxy or content filtering system, for example.

Certain embodiments adjust rendering of web pages to help clarify which links are inaccessible under a user's current access policy. That is, a user is made aware which links are reachable and which links are not reachable without having to click on the link to find out. Such status indication may help save the user time and frustration, making his or her browsing experience more productive and enjoyable.

FIG. 1 illustrates a system 100 for access to Internet content in accordance with an embodiment of the present invention. The system 100 includes a Web proxy 110, a Web browser 120, and an Internet or other network 130. The proxy 110 includes a client proxy 112, a content renderer 114, a content analyzer 116, and a content retriever 118. Components of the proxy 110 may utilize a content cache 115 and a content policy 117, for example. Components of the system 100 may be implemented in hardware, software and/or firmware as separate components and/or integrated in one or more forms, for example.

The client proxy 112 accepts requests from the Web browser 120 for Web page content, for example. The content retriever 118 retrieves Web page or other similar content from the Internet 130, for example. The content is cached or stored (at least temporarily) in the content cache 115. The content retriever 118 triggers the content analyzer 116 to analyze the retrieved content from the Internet 130. The content analyzer 116 uses content policy 117 and/or other information/rules to analyze the retrieved content from the content cache 115. If the content analyzer 116 determines that the retrieved content is consistent with the proxy's content policy 117, the content is provided to the content renderer 114. The content renderer 114 renders or forms content for viewing by a user via the Web browser 120. The rendered content is provided to the client proxy 112 for display to the user at the Web browser 120.

In certain embodiments, when a Web page is retrieved, analyzed and cached for viewing by the proxy 110, hyperlinks (links) and/or other connection(s) to external content (additional Web page(s), for example) are retrieved and analyzed before being requested via a user Web browser 120 (i.e., pre-fetched). A content or access policy, such as a listing of allowed and/or prohibited URLs, may be dynamically updated and/or otherwise modified based on the pre-fetching and analysis of retrieved link content, for example. Links may automatically be authorized and/or blocked based on the pre-fetching and analysis instead of or in addition to an analysis after the link content has been requested, use of a static list of allowed and/or prohibited URLs, etc.

Analysis may include a signature analysis, hashing, checksum, malware patterns, virus and/or other malware definitions, gene information, information as classifications based on groupings of genes, etc. Malware or unsafe or unwanted content may be detected in a variety of ways, such as by comparing checksum of a file to a stored checksum value, pattern matching to identify known patterns in files, electronic mail and/or disk areas (e.g., boot sectors), emulating all or part of a file's code to try and detect malware, such as polymorphic viruses, which may reveal themselves during execution, and/or extracting and analyzing functionality from a file by matching genes and/or classifications defined from groupings of genes, e.g., PHENOTYPE™ and/or GENOTYPE classifications (PHENOTYPE™ is a trademark of the assignee of the present patent application). Pattern matching and other forms of detection may be performed using Virus Identity Files (IDEs) or other identity files that contain algorithms describing various characteristics of a virus and/or other malware or unsafe or unwanted content for use in recognition.

In certain embodiments, malware or unsafe or unwanted content may be classified without requiring a most up-to-date set of definitions and/or signatures. A file and/or functionality within a file may be classified as malicious, non-malicious, suspicious, unsafe, unwanted, etc., based on functionality and/or relationships between or combinations of functionality, for example. Alternatively and/or in addition, particular programs represented by and/or included in the file may be identified.

Thus, content such as malware, unsafe content and/or unwanted content may be filtered or blocked by the proxy 110 before reaching the Web browser 120. In certain embodiments, the proxy 110 may notify one or more external systems regarding content allowed and/or restricted.

Components of system 100 may be implemented in software, hardware and/or firmware, for example. The components of system 100 may be implemented separately and/or implemented in a variety of combinations. Components of system 100 may be implemented on a single computer system for processing software, data, and messages. Alternatively, components of system 100 may be implemented in a distributed network where different processes occur on different machines with a communication network to allow sharing of information. System 100 may be implemented using one or more software programs.

Figure 2:
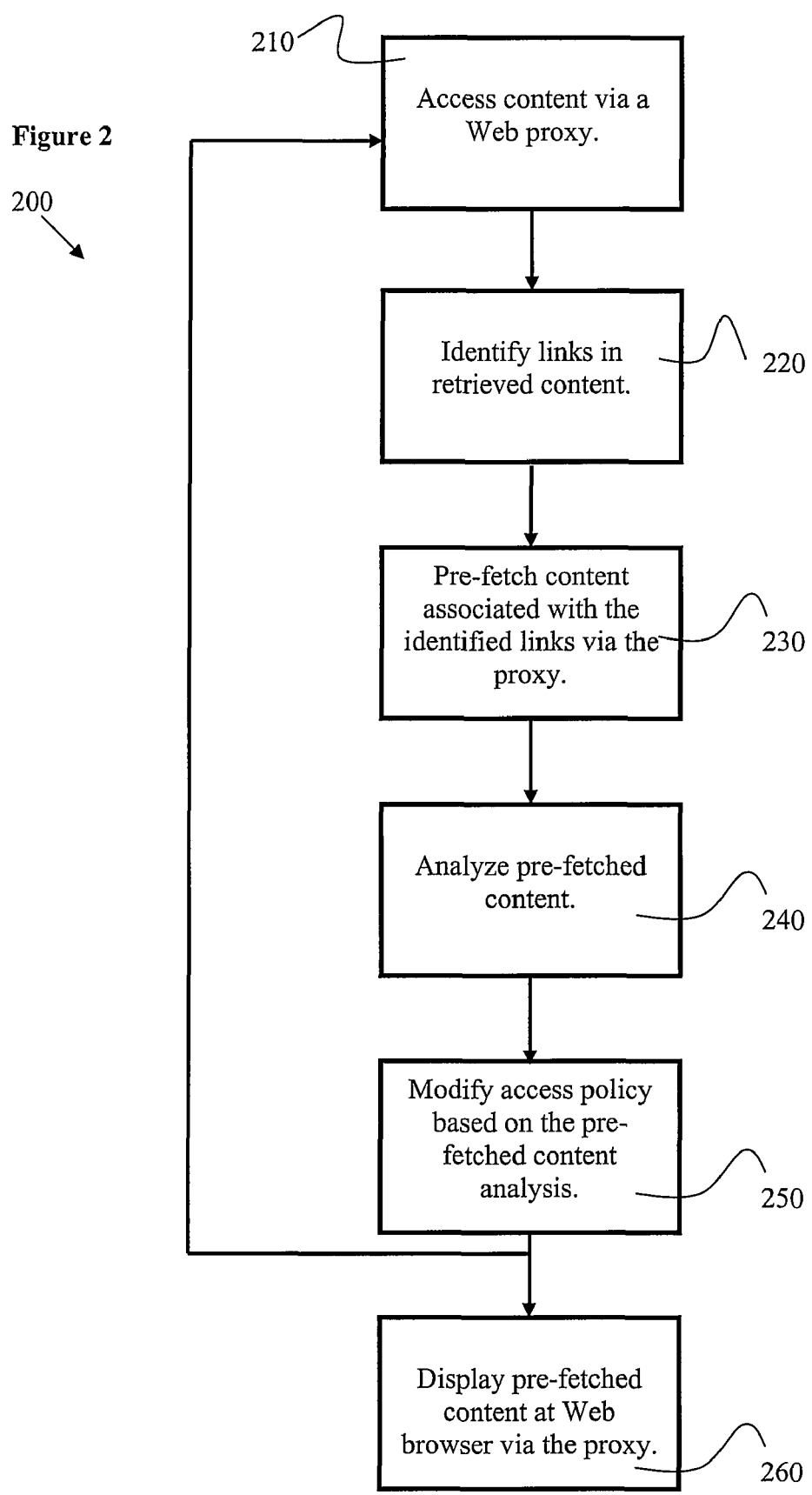
FIG. 2 illustrates a flow diagram for a method for content pre-fetching and analysis using a Web proxy in accordance with an embodiment of the present invention.

FIG. 2 illustrates a flow diagram for a method 200 for content pre-fetching and analysis using a Web proxy in accordance with an embodiment of the present invention. At step 210, content is accessed via a Web proxy. For example, a Web page URL is accessed using a Web browser in communication with a Web proxy. The content may be analyzed to determine compliance with a proxy content policy before display to a user, for example.

At step 220, one or more links and/or other embedded URL information are identified in the retrieved content. For example, hypertext links, executable content and/or other reference to external content are identified within a Web page. Alternatively and/or in addition, other linked or embedded content, such as a browser helper object or other library or resource file, may be identified for retrieval and analysis within a web browser, such as Internet Explorer.

At step 230, Web pages and/or other content corresponding to the identified links and/or embedded URLs are pre-fetched by the proxy. That is, the referenced content is retrieved by the Web proxy for analysis prior to display. In certain embodiments, first retrieved content may be displayed via the Web browser while linked content is being pre-fetched and analyzed, for example.

At step 240, the pre-fetched content is analyzed. For example, the content is compared to a set of rules and/or URLs included in a content or access policy for a user, proxy and/or other group. At step 250, an access or content policy may be modified based on the pre-fetched content analysis. For example, one or more pre-fetched URLs may be allowed and/or blocked based on analysis of their content.

At step 260, pre-fetched content may be displayed at a Web browser via the proxy. For example, pre-fetched content is cached and provided to a user at a Web browser or other viewing software when the content is requested (e.g., a link is selected). In certain embodiments, content referenced by links found in the pre-fetched content may be automatically pre-fetched as the current pre-fetched content is being rendered and displayed. In certain embodiments, multi-level pre-fetching may be configured based on one or more criteria such as a number of links of depth. For example, pre-fetched content may directly linked or connected to current content, or indirectly linked or connected to the current content.

In certain embodiments, a link may be rendered to reflect a status of a link and/or content associated with the link. Link status may include allowed, blocked or restricted, for example. Link status may also include a reason for blocking or restricting content, such as "site known to contain malware", "out of hours", "inappropriate content", etc. In certain embodiments, link status dynamically changes based on analysis of retrieved content.

For example, a proxy system may provide access to network content. The proxy system may include a content retriever retrieving content on a network; a content analyzer identifying and analyzing one or more links in the first content according to a content policy; and a content renderer for rendering content for display to a user. The content renderer renders a representation of the one or more links in the content based on a status of the one or more links. In certain embodiments, the status of the one or more links is based on a categorization of the one or more links. The categorization may be obtained from a database of link categorizations, for example. The link categorizations may be based on content analysis, for example. In certain embodiments, content analysis and link categorization are performed a local computing device including the content renderer and/or a remote computing device for transmission to a local computing device including the content renderer, for example.

Link status may include allowed, blocked or restricted, for example. A link status of blocked or restricted may also include a reason for blocking or restriction, for example. In certain embodiments, link status dynamically changes based on analysis of retrieved content by the content analyzer.

Figure 3:
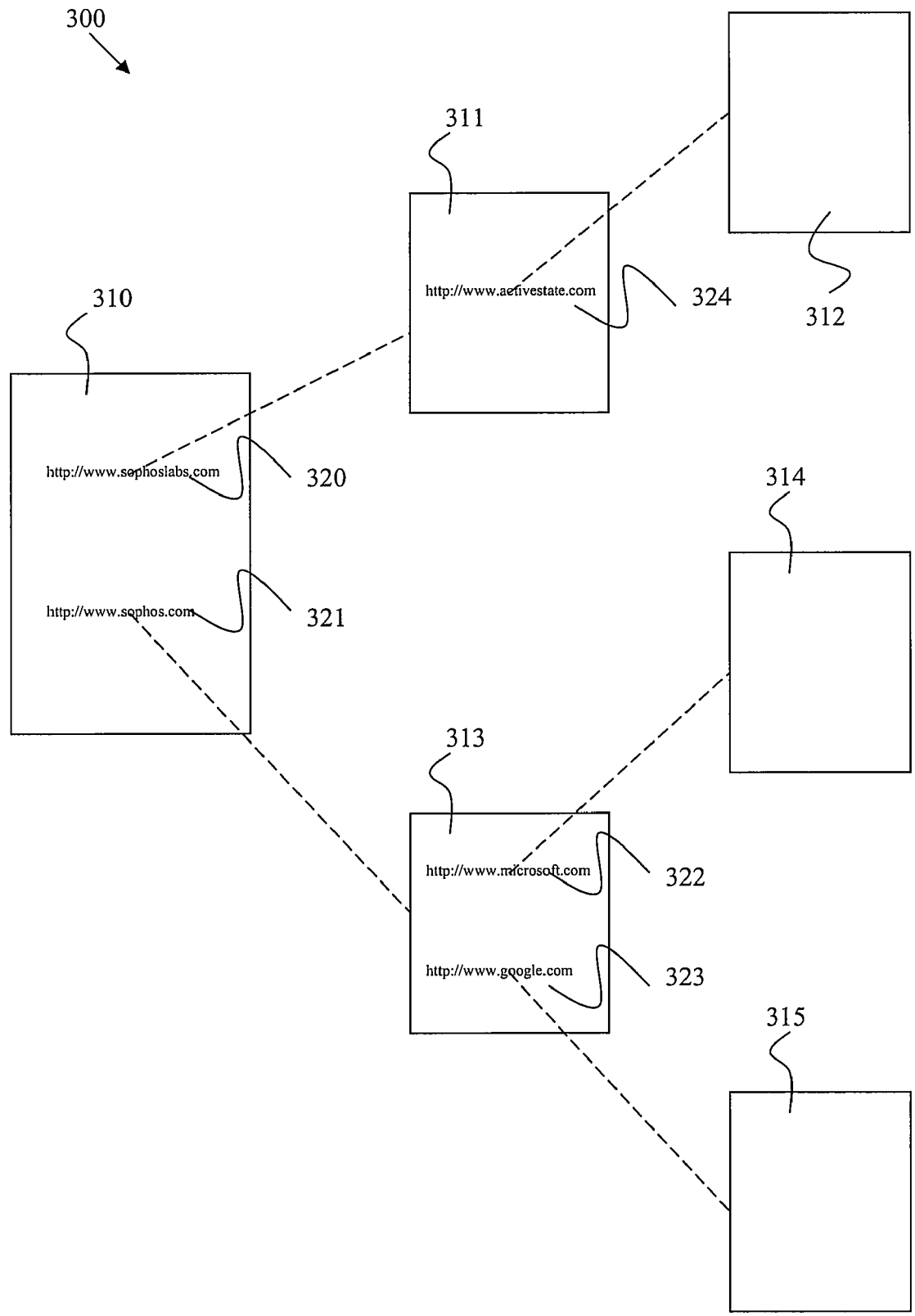
FIG. 3 illustrates an exemplary graph of Web pages constructed in relation to a current page being viewed in accordance with an embodiment of the present invention.

In certain embodiments, as shown in FIG. 3, a graph 300 of Web pages 310-315 may be constructed in relation to a current page 310 being viewed, for example. The graph includes a relationship or connectivity between pages 310-315 and is used in conjunction with an access policy to provide content to a user via a proxy, for example. Pages 310-315 can be related either directly or indirectly from the current page by following a chain of one or more links 320-324. In certain embodiments, links may connect library and/or other content, such as a browser helper object or other dynamic linked library, to a first content. In certain embodiments, a depth of iterative pre-fetching may be configurable according to one or more of a default value, user setting, system setting, etc. Thus, multi-depth scanning and link rendering may be achieved using certain embodiments of the present invention. Both static (e.g., policy information) and/or dynamic (e.g., content analysis) information may be used to modify the access policy and provide access to content for a user, for example.

One or more of the steps of the method 200 may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

Thus, certain embodiments provide systems and methods for pre-fetching linked Web page or other content for analysis and approval or denial consistent with a proxy's access policy. Alternatively and/or in addition, other linked or embedded content, such as a browser helper object or other library or resource file, may be identified for retrieval and analysis within a web browser, such as Internet Explorer. Certain embodiments cache and analyze content before the content is requested by a user. Certain embodiments help provide improved analysis of content through pre-fetching the content and providing a proxy server with more time to analyze the content before the content is requested by a user.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A proxy system for analyzing pre-fetched network content, the proxy system embodied on a local computing device including the following components realized in software executing on the local computing device:
    a content retriever for retrieving a first content on a network, said content retriever configured to pre-fetch additional content linked or connected to said first content;
    a content analyzer for analyzing said first content and said pre-fetched additional content according to a content policy and allowing access to said first content and said pre-fetched additional content in accordance with said content policy, wherein said content policy includes at least one malware definition for detecting unwanted malware to be filtered or blocked by the proxy system, thereby providing allowed content; and
    a content renderer for rendering said allowed content according to said content policy for provision to a user upon user request, wherein said content renderer renders links to said allowed content based on a status of said links, and wherein the link status dynamically changes based on analysis of retrieved content by said content analyzer.

2. The system of claim 1, wherein said content renderer provides content to a user via a Web browser.

3. The system of claim 1, wherein said content analyzer adjusts said content policy based on analysis of said first content and said pre-fetched additional content.

4. The system of claim 1, further comprising a content cache for storing said first content and said pre-fetched additional content.

5. The system of claim 1, further comprising a client proxy for providing said rendered content to a browser for display to a user.

6. The system of claim 1, wherein said content policy comprises at least one of a list of allowed content and a list of prohibited content.

7. The system of claim 1, wherein said pre-fetched additional content is a) directly linked or connected to the first content, or b) indirectly linked or connected to the first content.

8. The system of claim 1, wherein said link status comprises allowed, blocked or restricted.

9. The system of claim 8, wherein said link status of blocked or restricted further comprises a reason for blocking or restriction.

10. A method for content analysis via a proxy, said method comprising:
    pre-fetching additional content linked or connected to a first content;
    analyzing said pre-fetched additional content according to a content policy, wherein said content policy includes at least one malware definition for detecting unwanted malware to be filtered or blocked by the proxy;
    allowing access to said pre-fetched additional content which is found to be acceptable per the content policy, thereby providing allowed content;
    rendering said allowed content according to said content policy for provision to a user upon user request; and
    marking said links to said pre-fetched additional content based on a status of said links, wherein the link status dynamically changes based on analysis of retrieved content.

11. The method of claim 10, wherein said rendering step provides content to a user via a Web browser.

12. The method of claim 10, further comprising adjusting said content policy based on analysis of said pre-fetched additional content.

13. The method of claim 10, further comprising storing said pre-fetched additional content.

14. The method of claim 10, wherein said content policy comprises at least one of a list of allowed content and a list of prohibited content.

15. The method of claim 10, wherein said pre-fetched additional content is a) directly linked or connected to the first content, or b) indirectly linked or connected to the first content.

16. The method of claim 10, wherein said link status comprises allowed, blocked or restricted.

17. The method of claim 16, wherein said link status of blocked or restricted further comprises a reason for blocking or restriction.

18. A software program embodied in a non-transitory computer readable medium having a set of instructions that, when executing on a computer, perform the steps of:

retrieving a first content on a network and pre-fetching additional content linked or connected to said first content;

analyzing said first content and said pre-fetched additional content according to a content policy and allowing access to said first content and said pre-fetched additional content in accordance with said content policy, wherein said content policy includes at least one malware definition for detecting unwanted malware to be filtered or blocked by a proxy system, thereby providing allowed content; and rendering said allowed content according to said content policy for display to a user upon user request, wherein said content renderer renders links to said allowed content based on a status of said links, and wherein the link status dynamically changes based on analysis of retrieved content.

19. The software program embodied in the non-transitory computer readable medium of claim 18, wherein said rendering provides content to a user via a Web browser.

20. The software program embodied in the non-transitory computer readable medium of claim 18, wherein said analyzing adjusts said content policy based on analysis of said first content and said pre-fetched additional content.

21. The software program embodied in the non-transitory computer readable medium of claim 18, further comprising instructions to perform the step of storing said first content and said pre-fetched additional content.

22. The software program embodied in the non-transitory computer readable medium of claim 18, further comprising instructions to perform the step of providing said rendered content to a browser for display to a user.

23. The software program embodied in the non-transitory computer readable medium of claim 18, wherein said content policy comprises at least one of a list of allowed content and a list of prohibited content.

24. The software program embodied in the non-transitory computer readable medium of claim 18, wherein said pre-fetched additional content is a) directly linked or connected to the first content, or b) indirectly linked or connected to the first content.

25. The software program embodied in the non-transitory computer readable medium of claim 18, wherein said link status comprises allowed, blocked or restricted.

26. The software program embodied in the non-transitory computer readable medium of claim 25, wherein said link status of blocked or restricted further comprises a reason for blocking or restriction.

27. A proxy system providing access to pre-fetched network content, the proxy system embodied on a local computing device including the following components realized in software executing on the local computing device:

a content retriever retrieving content on a network;

a content analyzer identifying and analyzing one or more links in said first content according to a content policy, wherein said content policy includes at least one malware definition for detecting unwanted malware to be filtered or blocked by the proxy system; and a content renderer for rendering content for display to a user, wherein said content renderer renders a representation of said one or more links to said content based on a status of said one or more links and based on said content policy, and wherein the link status dynamically changes based on analysis of retrieved content by said content analyzer.

28. The system of claim 27, wherein said status of said one or more links is based on a categorization of said one or more links.

29. The system of claim 28, wherein said categorization is obtained from a database of link categorizations.

30. The system of claim 29, wherein said link categorizations are based on content analysis.

31. The system of claim 30, wherein said content analysis and link categorization are performed on at least one of 1) a local computing device including said content renderer and 2) a remote computing device for transmission to a local computing device including said content renderer.

32. The system of claim 27, wherein said link status comprises allowed, blocked or restricted.

33. The system of claim 32, wherein said link status of blocked or restricted further comprises a reason for blocking or restriction.

34. The system of claim 33, wherein said content renderer enforces a blocking or restriction of content associated with said link.

* * * * *